(12) United States Patent
Rauch et al.

(10) Patent No.: US 6,381,209 B1
(45) Date of Patent: Apr. 30, 2002

(54) MULTI-CHANNEL OPTICAL HEAD FOR OPTICAL RECORDING AND READING OPTICAL STORAGE DATA

(75) Inventors: Russell B. Rauch, Pasadena; Mark Shi Wang, Irvine, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/407,674

(22) Filed: Sep. 28, 1999

(51) Int. Cl.[7] .............................................. G11B 7/00
(52) U.S. Cl. ................................. 369/121; 369/112.28
(58) Field of Search ..................... 369/112.01, 112.05, 369/112.22, 112.28, 44.37, 44.23, 121

(56) References Cited

U.S. PATENT DOCUMENTS 4,466,087 A   8/1984  Cheng ........................ 369/45

5,808,986 A  * 9/1998  Jewell et al. ............ 369/44.37

* cited by examiner

*Primary Examiner*—Nabil Hindi
(74) *Attorney, Agent, or Firm*—William Propp

(57) ABSTRACT

The multi-channel optical head for recording and reading optical storage data has a write laser array for generating a plurality of write beams and a read laser array for generating a plurality of read beams. The write beams and the read beams share a common optical path with a first broadband non-polarizing beam splitter which directs the beams towards the optical recording medium or to a power detector and with a second broadband non-polarizing beam splitter which directs the write beams and the read beams to the optical recording medium and which directs the read beams, after retroreflection and information modulation from the optical recording medium, to be split by a beam splitter and focused onto a detector to provide focusing information and another detector which detects its intensity to read data and provides tracking information.

5 Claims, 1 Drawing Sheet

MULTI-CHANNEL OPTICAL HEAD FOR OPTICAL RECORDING AND READING OPTICAL STORAGE DATA

BACKGROUND OF THE INVENTION

The present invention relates to an optical head for recording and reading optical storage data and, more particularly, to a multiple channel optical head with a single laser array for emitting separate write and read beams sharing a common optical path.

Optical storage media such as digital optical disks or digital tapes are alternatives to magnetic tape and disk memories. Optical storage offers a substantially greater data storage capacity than commercially available magnetic tape or disk memories of similar size. Optical storage media can be fixed in position within the optical writing and reading system or can be removable from the system.

A high data transfer rate is desirable in optical writing and reading systems, in addition to a large capacity for storage of data. The adoption of a multi-beam optical head has been proposed in which a plurality of writing and reading converging light beam spots are used in the optical head to obtain the high data transfer rate.

An optical head is used to write and read data on an optical recording and storage medium, which can be physically rotated or moved to allow access of various parts of the recording and storage medium to beams from the optical head.

With optical disk systems, an optical head can have separate lasers with separate optical paths for writing, reading, and tracking of the read/write laser spots on the optical recording and storage medium disk. The major advantages of such a system are good performance and versatility, while the major disadvantages are complicated optics, critical alignment, bulk and expense.

Alternately, the write laser and the read laser can be closely spaced in the optical head and share a common optical path to the optical recording medium. This provides the advantages of a compact system in size and easier alignment due to shorter optical paths.

It is an object of this invention to provide a multi-channel optical head for recording and reading optical storage data with a single laser array for emitting separate write and read beams sharing a common optical path.

SUMMARY OF THE INVENTION

According to the present invention, the multi-channel optical head for recording and reading optical storage data has a single laser array for generating a plurality of write beams or read beams. The write beams are information modulated beams with a relatively higher intensity while the read beams are constant magnitude beams with a lower intensity. The write beams and the read beams will not be concurrently using the optical paths of the optical head.

The write beams and the read beams share a common optical path starting with a first broadband non-polarizing beam splitter which directs the beams in the common optical path towards the optical recording medium or to a power detector. The write and read beams will pass through a second broadband non-polarizing beam splitter, be circularly polarized by a quarter-wavelength plate, and then focused by an object lens onto the optical recording medium.

The write beams will record data on the moving optical storage medium, such as an optical disk or optical tape. The read beams will read the data from the moving optical storage medium and retroreflect back through the object lens to be directed by the second broadband non-polarizing beam splitter along a separate optical path. The read beams will be split by a beam splitter and focused by a focusing lens onto a detector to provide focusing information and another detector which detects its intensity to read data and provides tracking information.

Other objects and attainments together with a fuller understanding of the invention will become apparent and appreciated by referring to the following description and claims taken in conjunction with the accompanying drawings.

DETAILED DESCRIPTION OF THE INVENTION

Figure 1:
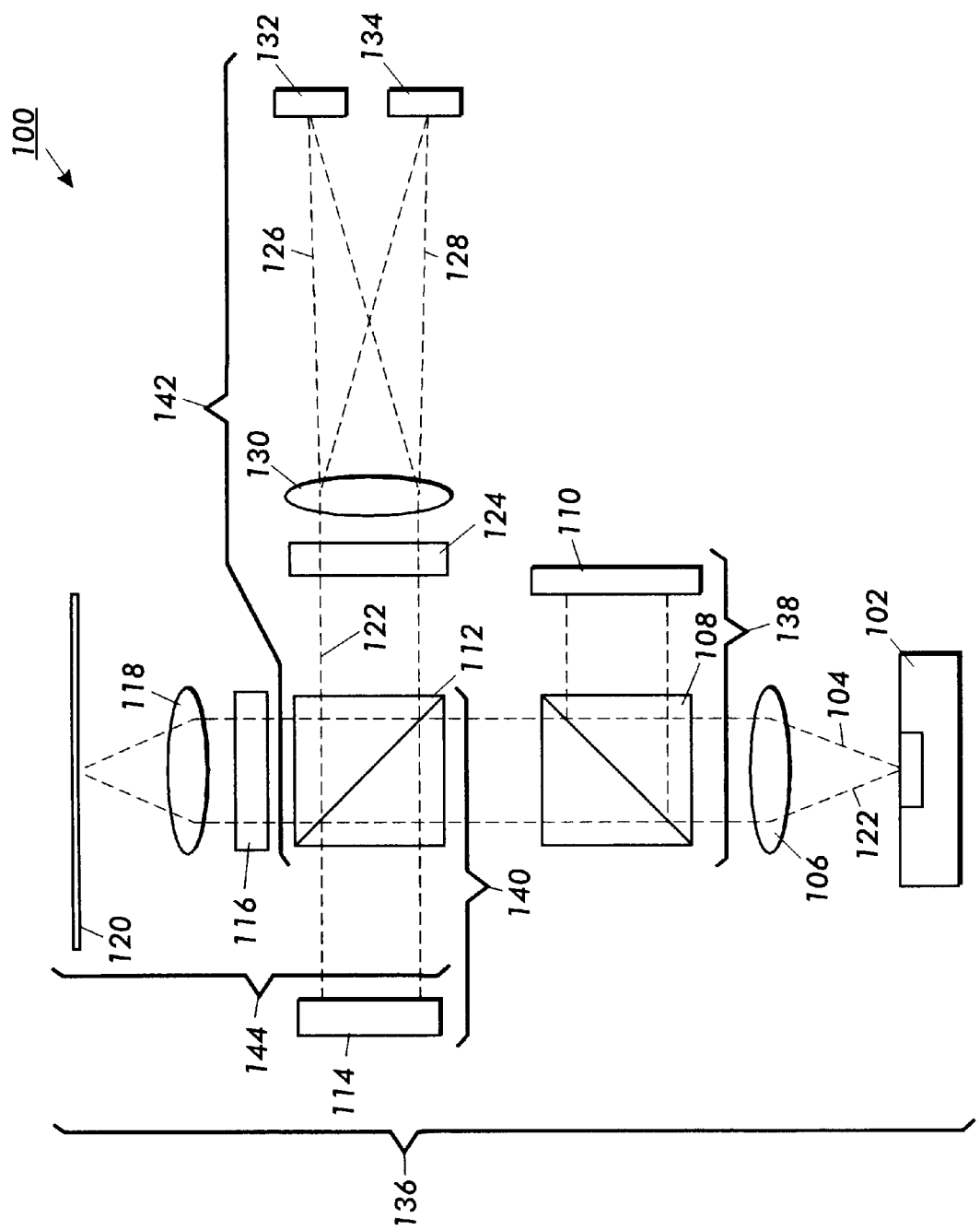
FIG. 1 shows a multiple channel optical head for recording and reading optical storage data of the present invention.

Reference is now made to FIG. 1, wherein there is illustrated a multiple channel optical head 100 for recording and reading optical storage data as an embodiment of the present invention.

A laser array 102 in the multiple channel optical head 100 has a plurality of independently addressable coherent light emitting elements to generate a plurality of laser beams 104. The laser array 102 can either be a linear array or an area array. The emitted laser beams 104 have a cross-section defined by the active, light emitting region of the laser which can be shaped by an aperture. The emitted light beams 104 are linearly polarized and all have a common wavelength.

Each light emitting element can be independently modulated and emit light at either a high or low intensity. Accordingly, the laser array 102 can emit either write beams or read beams from the optical head 100.

In the write mode, each light emitting element of the laser array 102 is independently modulated to provide an information modulated write beam 104 of a high intensity.

The linearly polarized write beams 104 are collimated by a collimating lens 106. The collimated linearly polarized write beams 104 then pass through a first broadband, non-polarizing, beam-splitter 108.

A portion of the write beams are split by the first beam-splitter 108 and directed to a power detector 110. Another portion of the write beams are split by the first beam-splitter 108 and directed to a second broadband, non-polarizing, beam-splitter 112.

A portion of the write beams are split by the second beam-splitter 112 and directed to an absorber 114 to block the return of the light beams from this path. Another portion of the write beams are split by the second beam-splitter 112 and directed to a first quarter-wavelength plate 116.

The linearly polarized write beams 104 are circularly polarized by the first quarter-wavelength plate 116.

The collimated circularly polarized write beams 104 then are focused by the first object lens 118 into a plurality of write beam spots onto the optical recording medium 120.

The optical recording medium 120 is a light level sensitive recording material which, typically, is a movable tape (by means not shown) during operation at an essentially constant velocity or a rotatable disk (by means not shown) during operation at an essentially constant angular velocity. For example, optical recording medium 120 can comprise an ablatable tellerium-based reflective film which is coated on an optically transparent substrate, such as glass or plastic or can comprise a phase change film (which varies in reflectivity).

The pulse output power of the write laser 102 is controlled by independent modulation of current applied to each light emitting element of the write laser array. The intensity of each write beam 104, as measured at the surface of the optical recording medium 120, shifts above and below a predetermined ablation threshold high intensity level for the optical recording medium as a function of the modulation.

Consequently, each write beam opens small holes in the optical recording medium along a data track position, or otherwise changes the physical nature of portions of the optical recording medium along a data track position, for example, by modifying its absorption, reflectivity or polarization properties, with such holes or changes representing the binary data which is to be recorded. The data track can be a portion of a continuous spiral or one of a plurality of concentric data tracks on a disk or parallel tracks on a tape.

The multi-channel beams 104 from the write laser 102 are used to record data on the optical medium 120.

The write beams 104 can also record fiducal lines or marks on the optical medium 120 to later enable accurate location of blocks of storage information. These fiducal lines or marks will ensure proper registration for the read beams for data that has been written by the write beams.

The first broadband, non-polarizing, beam-splitter 108 will also partially reflect the write beams 104 to the detector 110 for power detection. The intensity of the write beams 104 is required to shift above and below a predetermined ablation (or reflectivity) threshold high intensity level for the optical recording medium 120. The detector 110 detects the power intensity of the write beams 104 and converts it to an electrical signal in the manner of a normal silicon photo-diode or other type photo-detection device. The output of the photo-detector 110 would be coupled to an amplifier (not shown) to amplify the signal to pass to the laser 102 power control circuit (not shown).

In the read mode, each light emitting element of the laser array 102 is continuous emission at a substantially constant magnitude to provide an unmodulated read beam 104 of a low intensity.

The linearly polarized read beams 122 are collimated by the collimating lens 106. The collimated linearly polarized read beams 122 then pass through the first broadband, non-polarizing, beam-splitter 108.

A portion of the read beams are split by the first beam-splitter 108 and directed to a power detector 110. Another portion of the read beams are split by the first beam-splitter 108 and directed to a second broadband, non-polarizing, beam-splitter 112.

A portion of the read beams are split by the second beam-splitter 112 and directed to a stop 114 to block the light beams. Another portion of the write beams are split by the second beam-splitter 112 and directed to a quarter-wavelength plate 116.

The linearly polarized read beams 122 are circularly polarized by the quarter-wavelength plate 116.

The collimated circularly polarized read beams 122 then are focused by the first object lens 118 into a plurality of read beam spots onto the optical recording medium 120.

The read beams 122 are reflected from the optical recording medium 120 and are modulated by the previously written and recorded data on the optical recording medium 120. The low intensity of read beams 122 is below the threshold recording level of the optical recording medium 120.

The first broadband, non-polarizing, beam-splitter 108 will also partially transmit the read beams 122 to the detector 110 for power detection. The intensity of the read beams 122 is required to be at a substantially constant magnitude and below the threshold recording level of the optical recording medium 120. The detector 110 detects the power intensity of the read beams 122 and converts it to an electrical signal in the manner of a normal silicon photo-diode or other type photo-detection device. The output of the photo-detector 110 would be coupled to an amplifier (not shown) to amplify the signal to pass to the laser 102 power control circuit (not shown).

The continuous unmodulated read beams 122 do not effect the optical properties of the optical recording medium 120 but are reflected after being intensity modulated in accordance with any recorded data the beam scans.

The reflected modulated read beams 122 are retroreflected back to the first quarter-wavelength plate 116.

The modulated circularly polarized read beams 122 are linearly polarized by the quarter-wavelength plate 116.

The modulated circularly polarized read beams 122 then are collimated by the first object lens 118 and propagated to the second broadband, non-polarizing, beam-splitter 112.

A portion of the reflected modulated read beams are split by the second beam-splitter 112 and directed to the first broadband, non-polarizing, beam-splitter 108. Interference and feedback at the laser array 102 are prevented by the right angle rotation of the polarization of the reflected beam after it passes through the quarter-wave plate 116.

Another portion of the reflected modulated read beams are split by the second beam-splitter 112 and directed to a binary beam splitter 124.

The modulated read beams 122 are then split by a binary beam splitter 124 into two beams 126 and 128 of equal intensity. The quarter-wavelength plate 116 has previously rendered the circularly polarized read beams linearly polarized again so that the beam splitter 124 will be more efficient.

The two modulated read beams 126 and 128 are each focused by the second object lens 130.

The optical head will ignore the signals from the two detectors in the write mode. Thus, the write beams which are retroreflected from the optical medium and follow this optical path to the two detectors will have either the two detectors not operating or any signals generated from the detectors will be ignored by subsequent electronics.

The first modulated read beam 126 is focused by the second object lens 130 onto a first detector 132 for autofocus detection. The first detector can be an astigmatic detector or a split detector.

The first detector 132 detects the information modulated light and converts it to an electrical signal that varies with the focus. The output of the photo-detector 132 would be coupled to an amplifier (not shown) to amplify the signal to control a servo actuator (not shown) to adjust the position of the first object lens 118 which focuses the read beams on the optical medium 120.

The multi-channel optical head 100 is movable along the line in the radial direction of the optical recording medium 120 by a driving means (not shown) if the medium is a disk or moveable along a line in the transverse direction of the optical recording medium 120 by a driving means (not shown) if the medium is a tape. In response to the autofocus detection signal, the objective lens 118 can be moved back and forth relative to recording material 120 by a servo controlled voice coil (not shown) so that the read beams 122 are sharply focused at the recording medium 120.

The second modulated read beam 128 is focused by the second object lens 130 onto a second detector 134 for data reading and trackline tracking. In the data reading mode, the detector 134 detects the information modulated read beams 122, reads the detected power versus time and converts it to an electrical signal in the manner of a normal silicon photo-diode or other type photo-detection device. The output of the photo-detector 134 would be coupled to an amplifier (not shown) to amplify the signal to pass to the output as digital data.

Simultaneously with the data reading mode, in the trackline tracking mode, the second detector 134 detects the information modulated read beams 122 that varies with tracking error and converts it to an tracking error signal. The error signal is connected to a differential amplifier (not shown) to amplify the signal to control a servo actuator (not shown) to adjust the position of the first object lens 118 which tracks the read beams on the optical medium 120.

A portion of the reflected modulated read beams are split by the second beam-splitter 114 and directed to the first broadband, non-polarizing, beam-splitter 108. Feedback is prevented since the polarization of the beams are rotated 90 degrees from the initial polarization.

The multi-channel beams 122 from the laser array 102 illuminate previously written data on the optical recording medium 120 for reading, illuminate previously written tracks on the optical recording medium 120 for tracking and supply a spot for focusing.

The laser array 102, the collimating lens 106, the first broadband, non-polarizing, beam-splitter 108, the second broadband, non-polarizing, beam-splitter 112, the quarter-wavelength plate 116, the first object lens 118 and the optical recording medium 120 form the first common optical path 136 for the write beams 104 and read beams 122.

The first broadband, non-polarizing, beam-splitter 108 and the power detector 110 form the second common optical path 138 for the write laser beams 104 and the read laser beams 122.

The second broadband, non-polarizing, beam-splitter 112 and the optical stop 114 form the third common optical path 140 for the write laser beams 104 and the read laser beams 124.

The second broadband, non-polarizing, beam-splitter 114, the beam splitter 124, the second object lens 130, the first autofocus detector 132 and the second read/track detector 134 form the first read optical path 142 for the read laser beams 122.

By means of a retroreflecting light and optical system, the same optical path 144 between the second broadband, non-polarizing, beam-splitter 112, the quarter-wavelength plate 116, the first object lens 118 and the optical recording medium 120 can be used not only for recording, but for read back of the recorded data on the recording media.

The write beams 104 and the read beams 122 will not be concurrently using the optical paths of the optical head 100. The optical head at any given moment will either be in a write mode or a read mode or neither. The optical head will never be in both a write mode and a read mode with the laser array 102 using the common optical paths at the same time.

While the invention has been described with reference to the structures disclosed, it is not confined to the details set forth, but is intended to cover such modifications or changes as they come within the scope of the following claims.

What is claimed is:

1. An optical head for recording and reading data on an optical recording medium comprising:

a light source for generating a plurality of data modulated write beams, said write beams being at a higher power level to record said data on said optical recording medium, or for generating a plurality of read beams, said read beams being at a lower power level to read said data on said optical recording medium, a first broadband non-polarizing beam splitter for directing said write beams or said read beams to a first detector for power detection or to said optical recording medium, a second broadband non-polarizing beam splitter for directing said write beams or said read beams to said optical recording medium and to direct said read beams retroreflected from said recording medium, and a beam splitter for splitting said retroreflected read beams from said second broadband non-polarizing beam splitter and directing said split beams to a second detector for focusing said read beams on said optical recording medium and a third detector for reading said data from said optical recording medium and for tracking said data from said optical recording medium.

2. The optical head for recording and reading data on an optical recording medium of claim 1 further comprising a quarter-wavelength plate for circularly polarizing said write beams or said read beams from said second broadband non-polarizing beam splitter prior to said write beams or said read beams being incident on recording medium, said quarter-wavelength plate linearly polarizing said retroreflected read beams from said recording medium prior to said read beams being split by said second broadband non-polarizing beam splitter.

3. The optical head for recording and reading data on an optical recording medium of claim 1 further comprising a lens for focusing said write beams and said read beams from said second broadband non-polarizing beam splitter onto said optical recording medium and said retroreflected read beams from said optical recording medium onto said second broadband non-polarizing beam splitter.

4. The optical head for recording and reading data on an optical recording medium of claim 1 further comprising a lens for focusing said retroreflected read beams split by said beam splitter onto said second detector and said third detector.

5. An optical head for recording and reading data on an optical recording medium comprising:

a light source for generating a plurality of data modulated write beams, said write beams being at a higher power level to record said data on said optical recording medium, or for generating a plurality of read beams, said read beams being at a lower power level to read said data on said optical recording medium, a collimating lens for collimating said write beams or said read beams, a first broadband non-polarizing beam splitter for directing said write beams or said read beams to a first detector for power detection or to said optical recording medium, a second broadband non-polarizing beam splitter for directing said write beams or said read beams from said first broadband non-polarizing beam splitter to said optical recording medium and to direct said read beams retroreflected from said recording medium, a quarter-wavelength plate for circularly polarizing said write beams or said read beams from said first broadband non-polarizing beam splitter, said quarter-wavelength plate linearly polarizing retroreflected read beams from said recording medium to said second broadband non-polarizing beam splitter, a first lens for focusing said write beams or said read beams from said quarter-wavelength plate onto said optical recording medium and said retroreflected read beams from said optical recording medium through said quarter-wavelength plate onto said second broadband non-polarizing beam splitter, a beam splitter for splitting said retroreflected read beams from said second broadband non-polarizing beam splitter, and a second lens for focusing said retroreflected read beams split by said beam splitter onto a second detector for focusing said read beams on said optical recording medium and a third detector for reading said data from said optical recording medium and for tracking said data from said optical recording medium.

* * * * *